Patented May 8, 1934

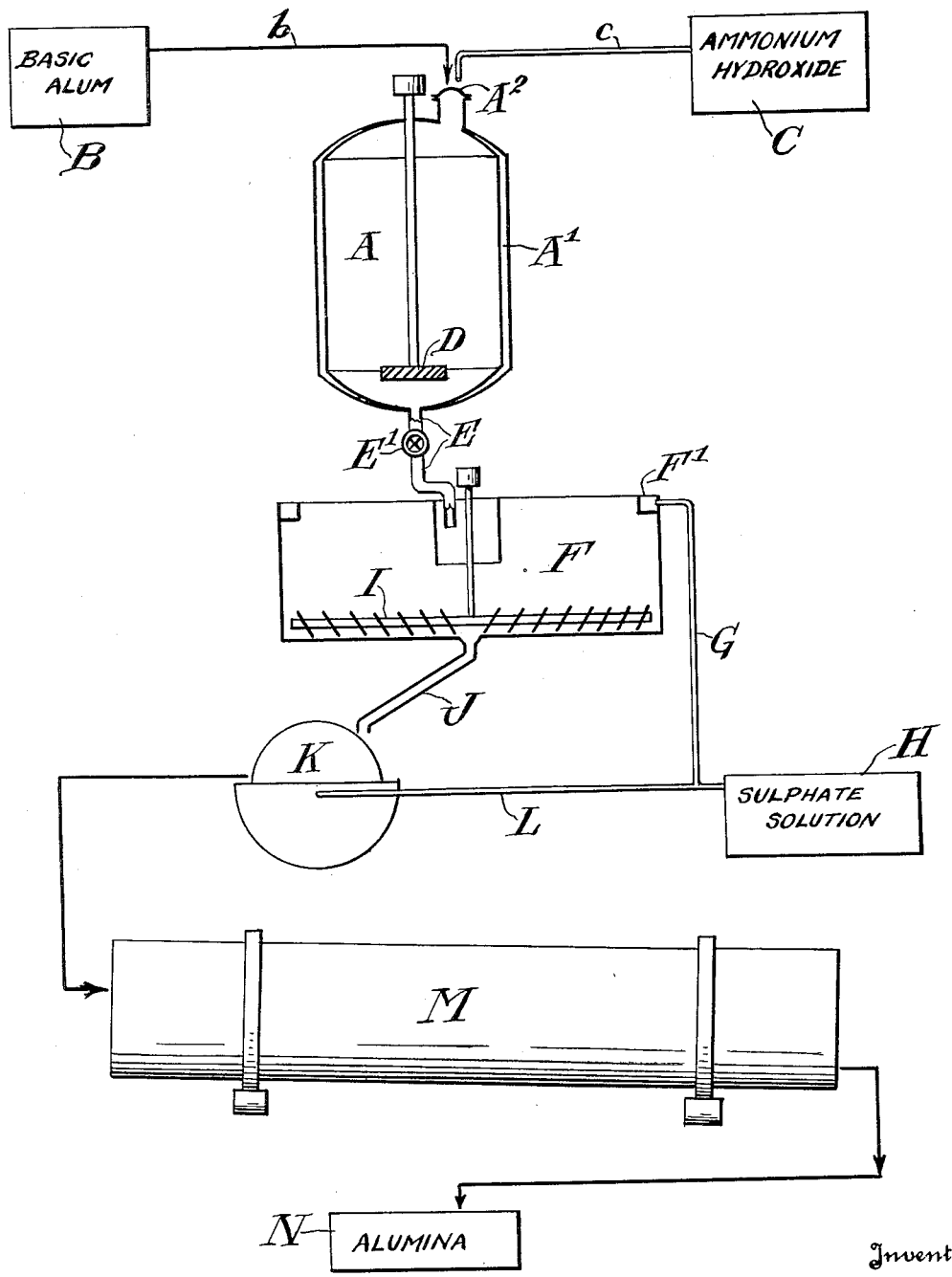

1,957,767

UNITED STATES PATENT OFFICE 1,957,767

MANUFACTURE OF ALUMINA

Arthur Fleischer, Hartford, Conn., assignor to Kalunite Company, Philadelphia, Pa., a corporation of Delaware Application June 30, 1933, Serial No. 678,421

1 Claim. (Cl. 23—141)

My invention relates to the manufacture of anhydrous nonhygroscopic alumina from basic ammonium alum as a starting material and has for its object to provide a simple and efficient method for the production of the alumina in an anhydrous nonhygroscopic state. It has been suggested that alumina could be produced by treating a basic ammonium alum with ammonium hydroxide to produce a reaction resulting in the production of alumina hydrate and a solution of ammonium sulphate and that alumina could be produced from the hydrate after separation from the solution by calcination at temperatures which would effect the dehydration of the alumina but, so far as I am aware, no satisfactory practical process for the utilization of the reactions had in view has heretofore been developed. A difficulty inherent in the suggested treatment of the basic alum is that if the ammonium hydroxide is used in quantity equivalent to the sulphur trioxide component with the aluminum sulphate constituent of the basic alum, the reaction will be quite rapid at first and becomes very slow as the ammonium hydroxide solution weakens so that many hours are required to effect the complete reaction. Again, while it is true that alumina hydrate produced by means of a complete reaction between ammonia and the sulphur trioxide component of the aluminum sulphate constituent of the basic alum can be dehydrated by calcination at temperatures not exceeding 700° C., the alumina produced at such temperatures is highly hygroscopic and it is necessary, in order to render the alumina nonhygroscopic, to raise the temperature to approximately 1000° C. or more, at which temperatures it is also true that basic ammonium alum can be decomposed with elimination by volatilization of the ammonium sulphate constituent of the alum and the production of an anhydrous nonhygroscopic alumina, though it is also true that the production of the alumina in this way must involve, for commercial practicability, steps to recover the ammonium and sulphuric acid values of the basic alum. If the basic ammonium alum is treated with a sufficient excess of ammonium hydroxide to materially hasten the reaction, means must be provided to recover the resultant excess of ammonia.

My new method of manufacturing alumina from basic ammonium alum as a starting material consists, in the first place, in treating the basic alum with an ammonium hydroxide solution containing ammonia in substantially less quantity than the equivalent of the sulphur trioxide component of the aluminum sulphate constituent of the basic alum. By preference I use a solution containing approximately 90% of the equivalent component weight of the ammonia and the advantage of my process is not sufficiently marked if the ammonia exceeds 95% and is still realized if the ammonia is present in not less than 80%. The reaction is quite rapid and at temperatures above 60° C., preferably at 100° C., is complete in from one to one and one-half hours, the reaction producing alumina hydrate, a percentage of undecomposed basic alum and a solution of ammonium sulphate free from uncombined ammonia, the amount of undecomposed basic alum being, of course, proportionate to the deficiency of the ammonia. The next step of my process consists in the separation of the insoluble alumina hydrate and basic alum from the ammonium sulphate solution and the final step consists in the calcination of the mixture of alumina hydrate and basic alum at temperatures approximately at or above 1000° C., with the result of decomposing the residual basic alum and volatilizing and driving off the ammonia and sulphuric acid constituents of the basic alum while at the same time the alumina hydrate is thoroughly dehydrated and the total product of alumina is produced in a form in which it is not hygroscopic. By this process the ammonia and sulphuric trioxide driven off in the calcination is lost but this loss can well be borne in view of the advantages which are inherent in the process.

My invention will perhaps be better understood as described in connection with the drawing which is a diagrammatic illustration of a plant adapted for use in carrying my process into effect. In the drawing A indicates an autoclave shown as provided with a steam jacket A¹ and a man-hole A² near its top. B and C are respectively reservoirs of basic ammonium alum and of ammonium hydroxide solution, b and c indicating conduits leading to the man-hole A² of the autoclave. D indicates stirring apparatus located in the autoclave and E a conduit leading from the bottom of the autoclave and provided with a valve E¹, which conduit connects with a thickener indicated at F, the thickener having at its top a launder F¹, from which a conduit G leads to a receptacle H for sulphate solution. The thickener is shown as provided with rakes I and with an outlet opening J at its bottom leading to a filter K indicated as a vacuum filter, from which a conduit for liquid, indicated at L, connects with the conduit G leading to the receptacle H. M indicates a calcining furnace indicated as a rotary furnace into which the filter cake is indicated as transferred and from which the alumina is withdrawn, as indicated, to a receptacle N.

In operation, a charge of basic ammonium alum is drawn from the receptacle B into the autoclave A and a charge of ammonium hydroxide solution containing ammonia not to exceed 95% of that equivalent to the sulphur trioxide component of the aluminum sulphate constituent of the basic alum is charged into the autoclave which is then closed and heated as by the steam jacket, or in any other convenient way, to a temperature of preferably approximately 100° C. The mixture contained in the autoclave is kept in agitation by the stirrer D and the reaction, at the temperature indicated, will be complete in about an hour with the result that the ammonia by combination with the sulphur trioxide of the aluminum sulphate constituent of the basic alum will be converted into ammonium sulphate with a proportionate breaking up of the basic alum involving the transfer into solution of the ammonium sulphate freed from combination and the production of an insoluble residue consisting of alumina hydrate and undecomposed basic ammonium alum. After the completion of the reaction the charge of the autoclave is preferably drawn off, as indicated, into a thickener F, from which ammonium sulphate solution is drawn off through the launder $F^1$ and conduit G and the thickened residue comprising all the solid material is drawn off from the thickener to a filter K in which the solid constituents, alumina hydrate and undecomposed basic alum are completely freed from the sulphate solution which is transferred from the filter to the receptacle H. The filter cake is then transferred to the calcining furnace indicated at M, where it is raised to a temperature of at least approximately 1000° C. with the result that the alumina hydrate is dehydrated and the basic alum is decomposed, any sulphur trioxide and ammonia constituents being permitted to escape and its alumina constituent being produced in the form of an anhydrous alumina which, together with the alumina produced by the dehydration of the alumina hydrate, is, at the temperature indicated, not only dehydrated but practically free from hygroscopic properties.

As a practical example of the proper charging of the autoclave in my process, I would give the following:

I charge the autoclave with 130 pounds of a wet filter cake containing 30 pounds of moisture and 100 pounds of basic alum of the composition, 14.3 pounds of ammonium sulphate, 33.3 pounds of alumina and 34.8 pounds of sulphur trioxide combined with the alumina and with a 10% ammonia solution containing 13.3 pounds of ammonia. At the completion of the reaction there will be 57½ pounds of ammonium sulphate in the solution and an insoluble residue comprising 45.8 pounds of alumina dry hydrate and 9.9 pounds of decomposed basic alum.

Having now described my invention, what I claim as new and desire to secure by Letters Patent, is:

The method of manufacturing nonhygroscopic alumina which consists in treating basic ammonium alum with ammonium hydroxide containing ammonia in quantity less than the equivalent of the sulphur trioxide component of the aluminum sulphate constituent of the basic alum to effect a complete conversion of the ammonia to a solution of ammonium sulphate and an incomplete decomposition of the basic alum, then separating the mixture of insoluble alumina hydrate and insoluble undecomposed basic alum from the ammonium sulphate solution and then calcining the mixture of alumina hydrate and basic alum at temperatures approximately at or in excess of 1000° C. to effect the dehydration of the alumina hydrate and decomposition of the residual basic alum and the production of an anhydrous nonhygroscopic alumina.

ARTHUR FLEISCHER.